W. B. KRAFT.
ALFALFA SHREDDER.
APPLICATION FILED MAR. 28, 1908.

936,783.

Patented Oct. 12, 1909.

2 SHEETS—SHEET 1.

Witnesses
Frank R. Elon
H. Rodgers

Inventor
W. B. Kraft.
By George J. Thorpe Atty.

W. B. KRAFT.
ALFALFA SHREDDER.
APPLICATION FILED MAR. 28, 1908.
936,783.
Patented Oct. 12, 1909.
2 SHEETS—SHEET 2.
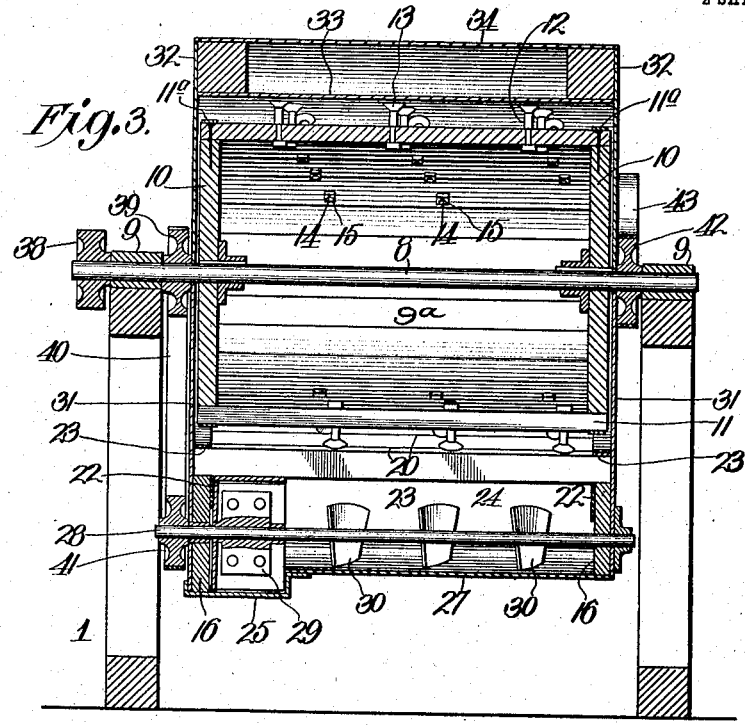
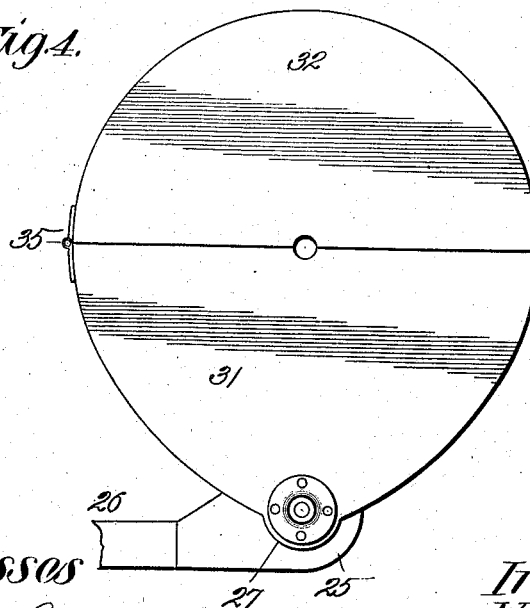
Witnesses
Frank R. Glover
H. C. Rodgers
Inventor
W. B. Kraft.
By George A. Thorpe Atty.

UNITED STATES PATENT OFFICE.

WESLEY B. KRAFT, OF MILAN, KANSAS.

ALFALFA-SHREDDER.

936,783.

Specification of Letters Patent.   Patented Oct. 12, 1909.

Application filed March 28, 1908. Serial No. 423,911.

*To all whom it may concern:*

Be it known that I, WESLEY B. KRAFT, a citizen of the United States, residing at Milan, in the county of Sumner and State of Kansas, have invented certain new and useful Improvements in Alfalfa-Shredders, of which the following is a specification.

This invention relates to alfalfa shredders and has for its object to produce a machine by which alfalfa can be reduced to fine shreds efficiently and economically.

A further object is to produce a shredding machine of simple, strong, durable and comparatively inexpensive construction.

Figure 1:
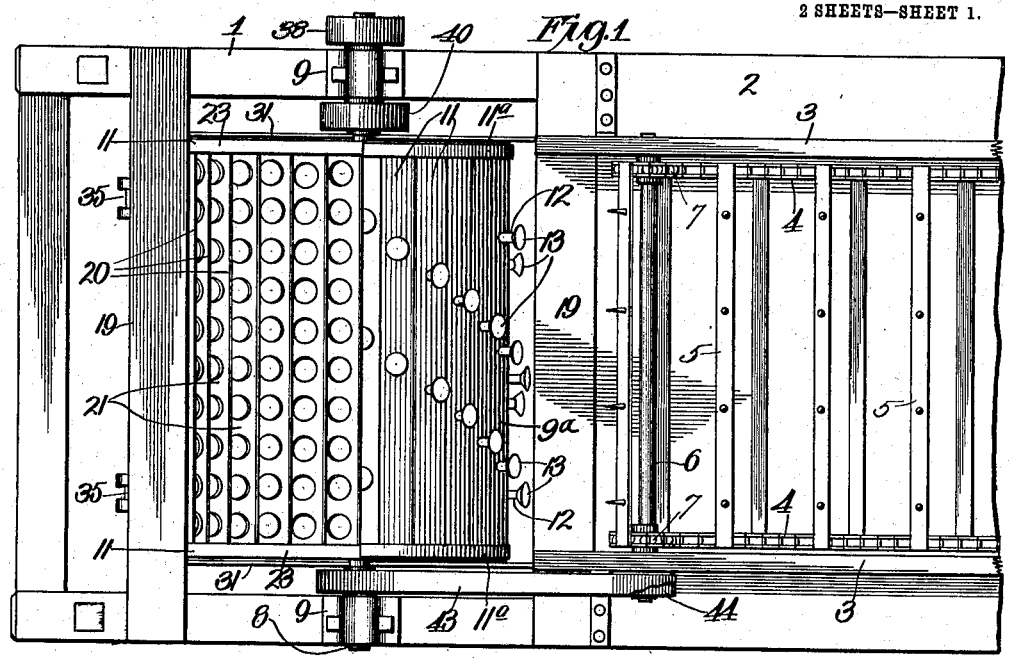
Figure 2:
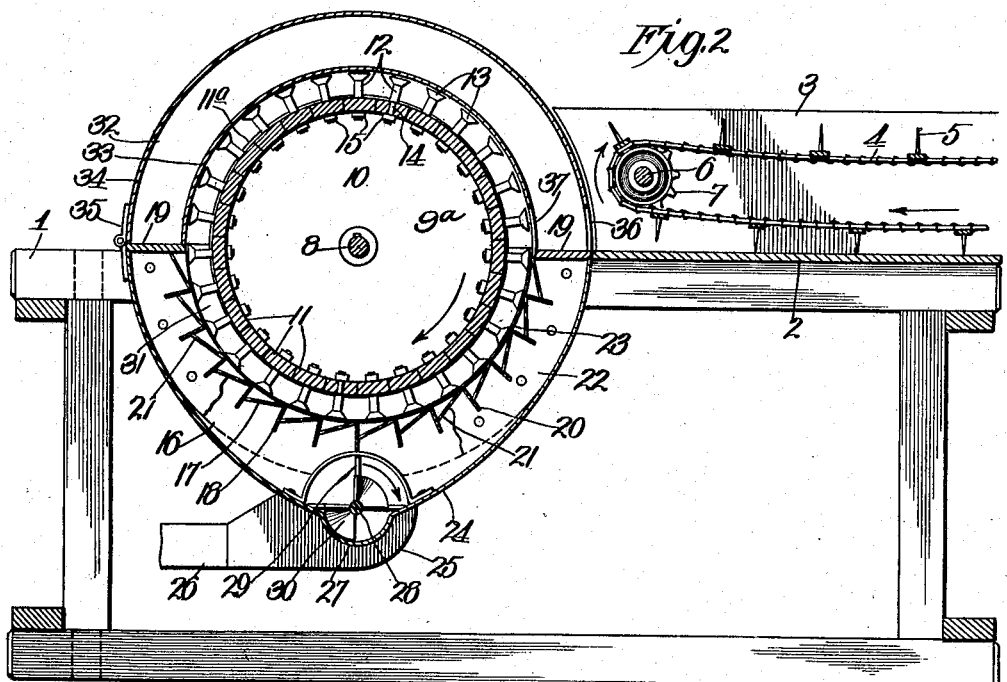

With these objects in view the invention consists in certain novel and peculiar features of construction and organization as hereinafter described and claimed; and in order that it may be fully understood reference is to be had to the accompanying drawings, in which, Figure 1, is a plan view of an alfalfa shredder embodying my invention, with the hood and half of the cylinder omitted. Fig. 2, is a central vertical section with the hood in place. Fig. 3, is a vertical transverse section with most of the cylinder teeth and the securing ends thereof omitted. Fig. 4, is a side elevation of the casing of the machine.

In the said drawings 1 indicates a suitable frame-work having a top 2 for a portion of its length flanked by vertical walls 3. An endless conveyer for forcing alfalfa toward one end of the top 2 consists of a pair of chains 4 connected by toothed cross slats 5 and mounted at their ends upon sprocket wheels 7 secured on transverse shafts 6, only one shaft 6 and its sprockets 7 appearing.

Forward of top 2 and in about the horizontal plane of the same is a transverse shaft 8 journaled in bearings 9 secured to the frame and secured rigidly on said shaft is a shredding cylinder 9ª constructed as follows: 10 indicates circular ends connected peripherally by slats 11 fitting edgewise together and secured to said ends, bands 11ª fitting around the ends of said slats as an additional precaution in securing them in position. 12 are radial pins projecting outward from the slats and terminating in enlarged conical shaped cutting heads 13, the pins having reduced stems 14 extending through the slats and engaged at their inner ends by nuts or taps 15. If desired the shredding pins may be in the form of wood screws secured to the slats. A casing for the cylinder is constructed as follows: A pair of semi-circular shaped ends 16 are arranged below and concentrically of the cylinder, their inner edges being serrated with ratchet-tooth-shaped notches 17 and with radially-extending kerfs 18 opening into the deep ends of said notches. 19 are horizontal bars connecting the ends 16 in the plane of top 2, and fitting in said kerfs and against the radial walls of the said notches are radially arranged knives 20. 21 are foraminous plates or screens secured upon the inclined or beveled faces of the ratchet-toothed-shaped notches of the ends 16 and corresponding in inclination to said beveled faces, and 22 are thin metal plates secured to the inner side of ends 16 and correspondingly notched and kerfed to accommodate the knives and foraminous plates, said plates 22 serving as wear and protection plates for ends 16 which are preferably of wood. 23 are semi-circular plates secured to the inner edges of bars 19 and fitting against the inner edges of the radial knives 20 to hold the same reliably in position, it being understood that said plates 23 will be secured at intermediate points to prevent lateral movement thereof. The knives and foraminous plates form what may be termed the inner or foraminous wall of the lower part of the casing, and connecting the outer edges of ends 16 is the outer wall or shell 24 of such part of the casing. Vertically below the shaft 8 and at one end the wall or shell 24 is cut away and closing said cut away portion is a fan casing 25 open at its inner side and provided with a discharge passage or spout 26. The outer wall or shell is preferably depressed centrally to form the transverse gutter or trough 27 and vertically above the same is the transverse shaft 28 equipped with a fan 29 within the fan casing and by preference with a central spiral conveyer 30, the conveyer being preferably of sectional form rather than a contiguous spiral because less power will be required to drive it, though it is to be understood in this connection that this conveyer is not indispensable. Secured to the outer sides of ends 16 in any suitable manner are end plates 31, preferably of sheet metal, which serve as the ends of the casing inward of the foraminous wall. The upper part of the casing is constructed preferably as follows: 32 are semi-circular end plates connected by an inner shell or wall 33 of substantially the same diameter as the foraminous wall of the lower or stationary part of the casing already described, and 34 is the outer shell or wall connecting ends 32 peripherally, the said upper part of the casing being preferably hinged as at 35 or otherwise to the lower part at the opposite side of shaft 8 from the conveyer, the said upper casing being provided also with feed openings 36 and 37 in its outer and inner walls respectively, through which the endless conveyer is adapted to force the material to be shredded, in the casing and into the path of the teeth of the cylinder. 38 indicates the belt wheel secured on shaft 8 and adapted to be driven at a high rate of speed by a belt not shown. Said shaft is also equipped with a belt wheel 39 connected by belt 40 with a belt wheel 41 on shaft 28. Shaft 8 is also provided with a belt wheel 42 connected by a belt 43 with a pulley 44 on shaft 6 of the conveyer. The belt wheel 38 is operated to cause the cylinder to rotate in the direction indicated by the arrow, Fig. 2, and through the medium of the connecting belts such power serves to drive the fan in the direction indicated by the contiguous arrow, Fig. 2, and the feeder as indicated by the contiguous arrow, same figure.

In practice, the material is deposited upon top 2 in any suitable manner and is forced forward thereof by the conveyer and crowded through feed openings 36 and 37 as hereinbefore stated. As it projects into the path of the cylinder teeth, which by preference are arranged spirally thereof, as shown, it is forced downward and crowded against the first of the radial knives, this action resulting in positively and reliably shredding the material. It then is brought against the second knife, then the third in a similar manner so that the succeeding knives will repeat the shredding operation until the material is shredded as finely as desired. It will be understood that the notches of the lower part of the casing form a series of pockets into which material is successively forced and momentarily arrested for the purpose of affording the cylinder teeth a better opportunity of performing, in conjunction with the knives, the shredding operation, it being also understood that the centrifugal force acquired by the material as it is driven around by the cylinder teeth results in a portion of it being forced through the foraminous plates as they are successively encountered. In practice practically all of the material is shredded and passes outward through the foraminous plates before it has made a half revolution, though it will be apparent that any material which is not completely shredded by the time it has traveled a half revolution will be carried over the cylinder by the teeth and on the second revolution be again subjected to the shredding action.

I have found in practice that by driving the cylinder at a high rate of speed, the centrifugal force produced is sufficient to effect the discharge of the finely shredded alfalfa or other material; but in order to make this withdrawal of the shredded alfalfa from the lower casing more positive and reliable and guard against any possibility of the cylinder becoming choked I have provided the fan which is driven rapidly in the direction explained and serves to create a suction in the casing which not only effects the discharge of the shredded material as rapidly as it passes through the foraminous plates, but also assists in drawing such shredded material through said plates, the employment of the spiral conveyer being desired chiefly to effect an even distribution of the material to the fan or blower.

From the above description it will be apparent that I have produced an alfalfa shredder embodying the features of advantage enumerated as desirable and I wish it to be understood that I reserve the right to make such changes as properly fall within the spirit and scope of the appended claims.

Having thus described the invention what I claim as new and desire to secure by Letters Patent is:—

1. A shredding machine, comprising a casing having a feed opening and a discharge passage, a series of radial knives and foraminous plates arranged to form a curved ratchet-toothed wall between said opening and passage, a rotatable cylinder provided with outwardly projecting teeth adapted to successively pass said knives in close proximity to their inner edges, when the cylinder is rotated, means to force material to be shredded, into the machine through the said feed opening and in the path of rotation of the teeth of the cylinder, and a conveyer for forcing shredded material passed through the foraminous plates, toward said discharge passage.

2. A shredding machine, comprising a suitable framework having a top for a part of its length, an endless conveyer to force material to be shredded along said top, a casing mounted on the frame work forward of the top and conveyer and consisting of an inner wall or shell and an outer wall or shell provided with alined feed openings above the plane of the top and with a discharge passage in the outer wall or shell at its lowest point, transverse bars between the inner and outer walls or shells of the casing in the plane of the top, radially arranged knives and obliquely arranged foraminous plates forming the inner wall or shell of the casing below said bars, a cylinder rotatable within the casing and provided with outwardly projecting pins terminating in conical shaped heads adapted to travel in close proximity to said knives and plates, and a rotatable fan or blower to exert a suction within the casing tending to draw material shredded by the knives and teeth, through the foraminous plates and the discharge passage of the casing.

In testimony whereof I affix my signature, in the presence of two witnesses.

WESLEY B. KRAFT.

Witnesses:
  PETER SCHAURER,
  J. P. WIMER.